Patented Nov. 2, 1937

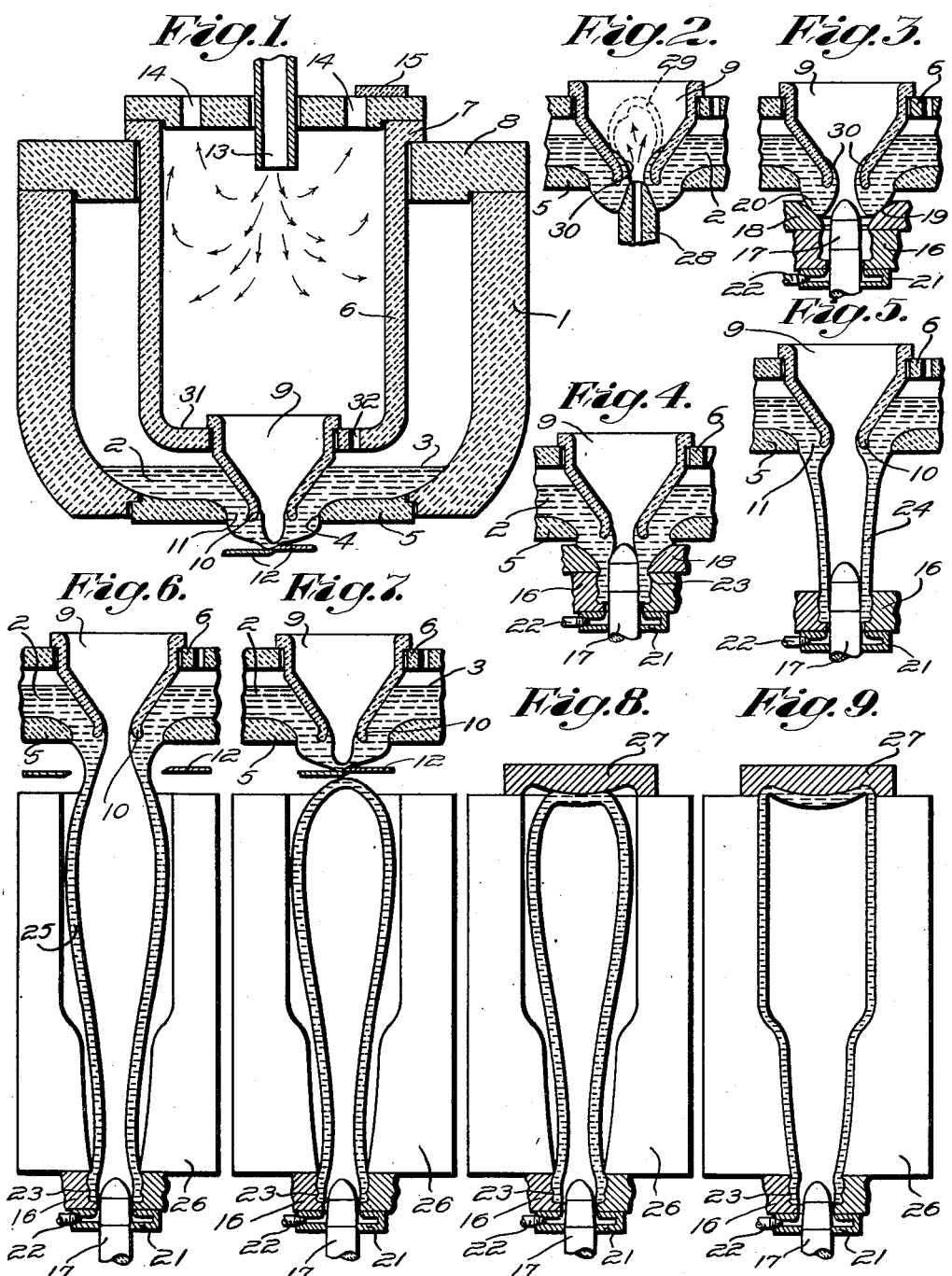

2,098,186

UNITED STATES PATENT OFFICE 2,098,186

METHOD OF AND APPARATUS FOR FORMING HOLLOW GLASS ARTICLES

George E. Howard, Butler, Pa., assignor to Hartford-Empire Company, Hartford, Conn., a corporation of Delaware Application September 11, 1935, Serial No. 40,034

26 Claims. (Cl. 49—5)

My invention relates generally to the manufacture of hollow blown glassware by mechanical means, and more particularly to the manufacture of finished glassware directly from glass derived from a parent body without the necessity of forming a blank in a blank mold as an intermediate step in the production of each finished article, although it is contemplated that my process may also be desirably carried on to include this intermediate step.

As is well known, it is customary in the manufacture of blown glassware to form a mold charge of molten glass in a blank mold into a blank or parison which has a shape somewhat similar to that of the finished article, and which usually includes a finished neck portion of the article. The blank thus formed is then taken out of the blank mold and is put into a finishing mold, which is larger than the blank mold, and is there blown to the final finished form.

It has been proposed, prior to my present invention, to form the body of an article of blown glassware before the glass of which such body is formed has been severed from the parent body of glass in a tank, furnace or other receptacle, and subsequently to form the neck portion or finish of the article after the glass to form the article has been severed from the parent body of glass. A method and apparatus for making blown glassware in this manner are disclosed in my prior Patents Nos. 1,592,299 and 1,995,276, granted respectively July 13, 1926 and March 19, 1935.

Among the objects of the present invention is to provide a method and essential apparatus elements for the manufacture of hollow blown glassware from an annular mass of molten glass, which may be discharged from an annular orifice in a container for a supply body of glass in a manner resembling in some respects the manner in which tubes are drawn in the prior art, the portion of glass to form each article being severed from the parent body subsequent to the partial formation of the article and subsequent to the complete formation of the finish portion thereof.

A further object of my present invention is to form not only the neck portion or finish, but also the body of an article of blown glassware at one operation without the use of a blank mold and so that the distribution of glass in different portions of the article being formed may be regulated and accurately controlled, whereby finished articles may be produced to have walls of uniform thickness throughout, or to have walls which will vary in thickness in different portions thereof, as desired.

A further object of my invention is to effect an economy in the production of blown glassware by forming the neck portion or finish of the article to be formed during the time that glass to form the remainder of the article is being delivered from the outlet of a glass container, and drawing an annular tube-like body of glass to form the remainder of an article approximating to some extent the shape desired while the glass of such tube-like body is being augmented by continued discharge from the container for the supply body of glass and before the partially formed article has been severed from the glass in the container.

Other objects and advantages of my invention will become apparent from the following description and appended claims, all when taken in conjunction with the accompanying drawing, in which Figures 1 to 9 inclusive are more or less diagrammatic vertical sectional views showing such parts of glass working machinery adapted for use in carrying out the invention as it is deemed necessary to disclose for an understanding of the principles of my invention, and illustrating certain successive steps in the production of an article of blown glassware according to that invention.

Glass working machinery adapted for use in carrying out my invention may comprise a container for molten glass such as is shown partially at 1 in Fig. 1 of the drawing and in fragmentary form in Figs. 2 to 7 inclusive. In the container 1, there is illustrated at 2 a bath of molten glass, the level 3 of which may be controlled in any manner well known in the prior art, such for example as by a gate intermediate the main body of glass in the tank and the glass in the forehearth, of which the container 1 may be a part. The container 1 is provided in its bottom with an outlet 4 which is submerged in the glass within said container and which may be in the form shown or in some other form known to the art. The member 5 in which the outlet 4 is formed is preferably either itself interchangeable or provided with an interchangeable outlet forming portion or orifice ring, so that the diameter, and possibly also the shape of the outlet, may be varied as desired. Such interchangeable orifice rings are now common in the glass feeder art and hence it has not been thought necessary to illustrate this construction in detail.

Located at least partially within the container 1 and preferably substantially centrally thereof is a chamber forming member 6 which, as shown, is provided with an upper outstanding flange 7 which may rest upon the top portion 8 of the container 1, or be supported in any other suitable manner. Centrally of the lower portion of the member 6, there is illustrated a funnel-like member 9 which has at its lower end an annular portion 10 located substantially in the outlet 4 and preferably substantially centrally thereof, the portions 4 and 10 defining therebetween an annular outlet 11 for molten glass. Below the annular outlet 11, there is illustrated a pair of shears 12, which may be of any kind well known in the art, as the V-shaped cooperating shear blades now in common use in connection with many commercial glass feeders. These shears may be operated by any mechanism, such as those now well known in the commercial art and illustrated in many patents devoted to glass feeding devices.

A burner, diagrammatically illustrated at 13, is shown directed to the interior of the space defined by the chamber forming member 6, this burner being of any type well known in the art and being adapted to use either gaseous or liquid fuel, as may be desired or available. I have illustrated at 14 outlets for the products of combustion from the burner 13, such outlets or some of them being provided with dampers, as shown diagrammatically at 15. In this way, the effective pressure within the chamber 6, and hence the pressure within the member 9 and inside the annular mass of glass discharged from the annular orifice 11, may be controlled within certain limits. I contemplate, however, that if necessary or desired, any other type of pressure control may be employed in this space, and further that any desired heating means, including for example the burner shown, may be employed for purposes hereinafter to be described in detail.

In Fig. 1, there is shown the position of the parts and the glass at the time of severance, which is substantially the same point in the cycle as that shown in Fig. 7. Fig. 2 shows the piercing of the sealed stub of glass depending from the orifice and the manner in which the glass bordering the aperture thus formed is reheated. Inasmuch, however, as these functions will be more easily understood after the process of producing an article has been set forth, this portion of the description will be deferred until that time.

I have illustrated in Fig. 3 a neck mold 16, which may be of any well known type, and which is preferably formed in complementary halves and mounted for opening and closing in the usual manner. Associated with the neck mold 16 is a neck pin, generally indicated at 17. It will be understood that any suitable mechanism may be employed for imparting to the neck pin the usual or any other desired movements in respect to the neck mold.

I have also illustrated in this figure, a receiving member 18 shown in cooperative relation with the neck mold 16 and which also is preferably formed in complementary portions or halves. Any suitable means similar to the usual neck ring holding and opening and closing means may be employed for supporting the member 18. The member 18 is shown inwardly and downwardly beveled at 19 for the initial receipt of the lower end of the annular mass of glass 20, to guide this mass into the neck mold and around the neck pin 17. I have also illustrated at 21 in a diagrammatic manner a pressure chamber associated with the neck mold 16 and surrounding the neck pin. Leading to this chamber is a pipe 22 which may communicate alternately with a source of vacuum and a source of pressure for purposes to be described. Any suitable means may be employed for supplying vacuum and pressure alternately to the chamber 21 and thence to the interior of the neck mold. Inasmuch as such means are well known in the art, it has not been thought necessary to illustrate them.

Also, in the embodiment of the invention here diagrammatically disclosed, gravity is depended upon to cause downward flow of the glass from the supply body 2 through the annular orifice or outlet 11 in an annular stream or mass as shown at 20. It will be understood, however, that any suitable mechanical or pneumatic means, such for example as those in use in the glass feeder art, may be employed in addition to gravity if it be desired.

There will also preferably be provided suitable means associated with the chamber 1 for controlling the temperature and hence the viscosity of the glass in this chamber. Such means also are well known in the glass feeder art for controlling the temperature of glass in a forehearth, and hence are not illustrated herein.

In passing from the stage of the process shown in Fig. 3 to that of Fig. 4, suction is applied through the pipe 22 to the chamber 21 to draw the glass of the lower end of the annular mass 20 down into the neck mold and form a completed neck finish of glass, as illustrated at 23. Subsequent to this operation and intermediate the stage of the process shown in Fig. 4 and that of Fig. 5, the first receiving member 18 is removed to some inoperative position (not shown) and the neck mold 16 is moved downwardly away from the outlet from the container 1. It will be understood that any suitable means may be employed for moving the neck mold in the manner described. During this movement the distribution of the glass in the side walls of the tube-like portion 24 being formed, is controlled by the joint action of the speed and characteristics of the lowering movement of the neck mold 16, the rate of flow of the glass from the supply body through the orifice 11 and the pressure established within the glass, which is the pressure within the chamber 6.

If the neck mold be moved quickly down, the annular tube-like portion of glass 24 will be attenuated and the walls made thin. Conversely, if a slower speed of movement is imparted to the neck mold, the walls will be thicker. If a sufficiently high internal pressure is supplied, the walls of the tube-like portion 24 may be distended to a somewhat bulbous form, as shown for example at 25 in Fig. 6. If desired also, wind might be blown on the tube-like portion of glass for hardening the surface thereof to form a skin and hence prevent momentarily at least the distortion of the cooled portion of the glass. It will be understood that any or all of the various means of wall thickness control may be employed to provide a tube-like body portion of the desired wall thickness and having a desired glass distribution at the several points or zones in its length.

In the transition from the stage of the process illustrated in Fig. 5 to that illustrated in Fig. 6, the finish in the neck mold has been drawn down to the desired level and the tubular body portion of glass expanded somewhat, as illustrated at 25, and a final blow body mold 26 has been closed about the tube-like portion of glass in normal cooperative position in respect to the neck mold. It will be understood that the body mold 26 may be suitably constructed and mounted in any manner well known in the art, there being no absolute necessity in this case, however, of provision being made for vertical movement for the body mold. I contemplate however, that such movement could be imparted to the body and neck molds once these molds are both closed in cooperative relation with each other for the purpose of attenuating the glass at the level at which it is to be severed from the parent body.

In passing from the stage of the process shown in Fig. 6 to that shown in Fig. 7, the shears 12 have been closed to sever the glass to form the article being made from that of the parent body of glass. This severing action has other results, some advantageous and some, to a certain extent, disadvantageous. In the first place, the severance serves to seal the upper end of the body of glass severed from the parent body and thus seals the upper end of the glass which later is formed into the bottom of the completed article. This is advantageous from the point of view of article manufacture. The severance, however, also serves to seal the lower end of the stub of glass depending from the orifice which is shown in Figs. 1 and 7. This introduces a complication into the process as it necessitates an aperture being formed through this stub before the formation of the next succeeding article to be made may be started. This portion of the process will be later described.

It will be understood that the shears 12 sever the glass at a level somewhat above the top of the mold 26. However, inasmuch as the hollow article thus severed is still quite plastic, it will soon sag down to a level below that of the top of the mold, so that a suitable bottom plate 27 may be placed upon the mold from any desired direction, that is, either from the top by a downward movement onto the mold or from one side. Subsequent to the positioning of the bottom plate 27 on the mold 26, and subsequent also to the retraction of the neck pin 17 in respect to the neck mold, which is shown as taking place between the steps of the process illustrated in Figs. 5 and 6 respectively, pressure is supplied from the pipe 22 and chamber 21 and through the neck mold to expand the glass into conformity with the internal cavity of the body mold 26 and against the bottom plate or baffle 27. It will be understood that the retraction of the neck pin may take place at any time after the completion of the formation of the neck or finish portion 23 as shown in Fig. 4 and prior to the initiation of the application of blowing pressure for expanding the article. The complete expansion of the article is illustrated in Fig. 9, the final blowing action in this portion of the cycle being substantially conventional.

Subsequent to the shearing as aforesaid, it is necessary to provide an aperture through the sealed lower end of the stub of glass, which may be done as illustrated by a comparison of Figs. 1 and 2. As shown, a nozzle member 28 may be employed for directing a stream of gaseous fluid upwardly against the sealed portion of the stub which has been formed by the shearing action as above explained. This portion may, if thick enough, be distended into a bulbous form as shown in dotted lines at 29 in Fig. 2, but if so, it will soon rupture, leaving a somewhat ragged edge. This ragged edge will be laid over the inside of the conical member 9, as illustrated at 30 and due to the heat supplied inside the chamber 6, the glass bordering the aperture will be melted down to a substantially homogeneous fluid condition. Alternatively, a piercing flame may be projected through the nozzle member 28 to provide the aperture in the glass by the joint heating and dynamic effect of the flame. The melting and homogenizing of the glass bordering the aperture may then be accomplished by the heat jointly supplied by the burner 13 and the piercing flame. Also, the nozzle member 28 may serve, by a mechanical action, to assist in forming the aperture in the glass, as shown in Fig. 2. This figure shows the nozzle projected up into the orifice to a short distance from the lower end 10 of the member 9 and in contact with the glass. It is desired that the nozzle 28 never be projected sufficiently far up so that it can contact with the rigid portion 10 as that might cause breakage of the refractory parts necessarily used in this connection due to hard glass getting in between. However, the nozzle may by its mechanical action serve to assist in the forming of the aperture, as aforesaid.

I also contemplate that, if desired, the neck pin 17 may be employed by the provision of a longitudinal bore therethrough and suitable fluid pressure and/or combustible fluid connections to carry out the functions here shown as accomplished by the nozzle 28. It will be understood that if this is done, the neck pin 17 will be moved adjacent to or into contact with the glass in the position of the member 28 in Fig. 2, or of the neck pin 17 in Fig. 3, to pierce the glass either by the dynamic action of a jet of gaseous medium, or by a piercing flame, or by its mechanical action, or some combination of these several actions. In any event, an aperture will be pierced through the solid lower end of the stub of glass depending from the orifice and the glass bordering the aperture sufficiently heated so as to be substantially homogeneous, so that upon the initiation of the production of the next succeeding article, there will be an annular mass of glass depending from orifice 11, substantially as shown at 20 in Fig. 3.

While the piercing of the stub of glass depending from the orifice 11 may take place in such manner that any bubble formed, as indicated in dotted lines at 29 in Fig. 2, incident to the piercing operation will be completely within the member 9, so that the glass therefrom may be melted down and homogenized by the heat from above and drain down the inside of the member 9, as indicated at 30, it is also possible under certain conditions that the bubble formed by the upward blast of gaseous medium from the piercing member as 28 may expand to larger proportions inside the chamber forming member 6. If then, upon the piercing or bursting of the bubble, portions of the glass thereof fall or sag down into the lower portion of the member 6 around the flange of the member 9, they will be prevented from draining down through the inside of the funnel member 9 due to the upper edge of this member being outwardly flanged, as illustrated in Fig. 1, and raised above the bottom of member 6 to form a gutter 31 in the lower part of that member around the flange at the upper peripheral edge of the funnel member 9. Any glass which finds its way into this gutter will be remelted by the heat within the member 6 and will drain down into the main body of glass 2 through a drain opening 32, Fig. 1. In this way, any large amount of glass will be prevented from draining down through the member 9 and possibly clogging this member.

While I have included herewith merely a diagrammatic illustration of certain essential mechanism for use in performing my method and have taught a specific method of forming hollow glass articles, it will be understood that many variations may be made both in the details of the apparatus and of the method here specifically described, including the variations herein suggested as well as others which will suggest themselves to those skilled in the art. I do not wish to be limited, therefore, except by the scope of the appended claims, which are to be construed as broadly as the state of the prior art permits.

I claim:

1. The method of forming hollow glass articles, which comprises the steps of receiving the open lower end of an annular suspended charge of plastic glass in a neck mold while the charge is still integral with the supply body of molten glass in a container from an outlet of which it is suspended, forming a neck finish on the lower end of the annular charge of glass, lowering the neck finish thus formed in respect to the container while glass continues to flow through the outlet from the supply body to form an elongated depending annulus of glass, surrounding the depending annulus of glass thus formed by a body mold, severing the glass within the body mold from that of the supply body and thereby sealing the upper end of the glass in the body mold, applying a bottom forming mold member to the upper end of the body mold, and blowing the glass into conformity with the body mold and the bottom forming mold which has been applied thereto.

2. The method of forming hollow glass articles, comprising the steps of establishing a supply body of molten glass in a container having a downwardly opening outlet in the bottom thereof, discharging an annular body of glass having an open lower end through said outlet in suspension from and integral with the molten glass in said container, receiving the lower end of the suspended annular body of glass in a neck mold and forming a neck finish thereon, severing the hollow annular body of glass attached by the formed neck finish to the neck mold from the parent body of glass in the container at a level spaced from said neck mold and thereby sealing the upper end of the severed body of glass and the lower end of the stub of glass depending from said container, forming the severed glass into an article of the desired size and shape, and forming an aperture in the lower sealed end of the depending stub of glass in preparation for the formation of the next succeeding article to be formed as aforesaid.

3. The method of making hollow glass articles, which comprises causing discharge of molten glass downwardly from a source of supply in an annular body having an open lower end, forming the open lower end of the annular body of the discharged glass to provide the neck portion of the article to be made, and severing the annular body of glass from the parent glass of the source of supply in such manner as to seal the upper end of the severed body of glass for the formation of a hollow article therefrom.

4. The method of making hollow glass articles, which comprises causing discharge of molten glass downwardly from a source of supply in an annular body having an open lower end, forming the open lower end of the annular body of the discharged glass to provide the neck portion of the article to be made, severing a part of the annular body of glass from the parent glass of the source of supply at a level spaced from the neck portion of the article formed as aforesaid and thereby sealing the upper end of the severed body of glass for the formation of a hollow article therefrom and also sealing the lower end of the stub of glass depending from the source of supply, and forming an opening in the sealed lower end of the stub to form again an annular body of glass depending from the source of supply for the formation of the next succeeding article.

5. The method of making hollow glass articles, which comprises forming the lower end portion of an annular mass of glass that is in suspension at its upper end from a source of supply of molten glass to provide a neck portion of an article of hollow glassware, and moving the formed neck portion away from the point of suspension of the mass of glass while supplying pressure from above into the interior of the annular mass of glass to prevent collapse or undesired narrowing of the annular body of glass thus being formed all while the glass remains integral with the supply body of glass.

6. The method of making hollow glass articles, which comprises forming the lower end portion of an annular mass of glass that is in suspension at its upper end from a source of supply of molten glass to provide a neck portion of an article of hollow glassware, moving the formed neck portion away from the point of suspension of the mass of glass while supplying pressure from above into the interior of the annular mass of glass to prevent collapse or undesired deformation of the annular body of glass thus being formed and thereby forming an elongated tubular glass body, and subsequently severing the tubular glass body thus formed from the parent body of molten glass in such manner as to seal the upper end portion of the glass which is severed.

7. The method of making hollow glass articles, which comprises forming the lower end portion of an annular mass of glass that is in suspension at its upper end from a source of supply of molten glass to provide a neck portion of an article of hollow glassware, moving the formed neck portion away from the point of suspension of the mass of glass while supplying pressure from above into the interior of the annular mass of glass to prevent collapse or undesired deformation of the annular body of glass thus being formed, severing the lower portion of the annular body of glass from the parent body in such manner as to seal the upper end of the portion being severed and simultaneously to seal the lower end portion of the depending hollow stub of glass, and forming an opening in the lower end of the depending stub of glass preparatory to the formation of the next succeeding article as aforesaid.

8. The method of making hollow glass articles, which comprises causing molten glass to issue downwardly from an annular outlet in a container for molten glass to form an annular depending charge, forming the lower end portion of the annular charge into the neck portion of a hollow article of glassware, maintaining a desired pressure into the interior of the annular charge through the center portion of the annular outlet from above, relatively moving the formed neck portion and the outlet to form a tube-like body portion of glass integral with the parent body of glass in the container, surrounding the tube-like body portion of glass with a mold having an interior contour shaped to form the desired article, and severing the glass within the mold from the parent body of glass in such manner as to seal the upper end of the hollow body of glass thus severed.

9. The method of making hollow glass articles, which comprises causing molten glass to issue downwardly from an annular outlet in a container for molten glass to form an annular depending charge, forming the lower end portion of the annular charge into the neck portion of a hollow article of glassware, maintaining a desired pressure into the interior of the annular charge through the center portion of the annular outlet from above, relatively moving the formed neck portion and the outlet to form a tube-like body portion of glass integral with the parent body of glass in the container, surrounding the tube-like body portion of glass with a mold having an interior contour shaped to form the desired article, severing the glass within the mold from the parent body of glass in such manner as to seal both severed ends of glass, completing the formation of a glass article of the desired shape in the mold, and opening an aperture into the lower sealed end of the stub of glass depending from the outlet resulting from the severance by the application of an upwardly directed stream of gaseous fluid thereto.

10. The method of making hollow glass articles, which comprises causing molten glass to issue from a downwardly opening outlet in a suspended annular mass, receiving the lower end of the annular mass in a neck mold and forming a neck portion thereon in such mold, lowering the neck mold away from the outlet at a speed coordinated with the rate of flow of the glass through the outlet to produce a hollow tubular mass depending from the outlet having selected wall thickness in the several portions thereof, and severing the tubular mass of glass extending between the neck mold and the outlet and at a desired distance from the neck mold in such manner as to seal the upper end of the body of glass thus severed and form a hollow body of glass.

11. The method of making hollow blown glassware which comprises causing molten glass to issue from a downwardly opening annular outlet in a suspended annular mass, receiving the lower end of the annular mass in a neck mold and forming a neck finish portion of glass in such mold, regulating the shape and thickness of the glass above the neck mold by moving the neck mold downwardly while engaged with the glass at a speed predetermined according to the shape and wall thickness of glass desired for the mass above the neck mold and thus forming a tubular body of glass connecting the glass in the neck mold with that of the parent body, surrounding the tubular body of glass thus formed by a body mold in operative relation with the neck mold, severing the glass within the body mold from the glass of the parent body in such manner as to seal the upper end of the glass within the body mold, and expanding the hollow body of glass into conformity with the internal cavity of the body mold.

12. The method of making blown glassware, which comprises causing molten glass to issue from an annular downwardly opening outlet in a suspended annular mass, receiving the lower end portion of the mass in a neck mold and forming a neck finish portion thereon, moving the neck mold downwardly while engaged with the glass, supplying pressure to the interior of the annular mass of glass formed by the downward movement of the neck mold away from the outlet, controlling the wall thickness of the annular mass of glass being formed by coordinating the rate of flow of glass through the outlet, the pressure being supplied to the interior of the annular mass of glass and the rate of movement of the neck mold away from the outlet, and severing a desired portion of the annular mass of glass thus formed from the parent body in such manner as to seal the upper end of the portion of glass thus severed to form a hollow body of glass.

13. The method of making blown glassware, which comprises causing molten glass to issue from an annular downwardly opening outlet in a suspended annular mass, receiving the lower end portion of the mass in a neck mold and forming a neck finish portion thereon, moving the neck mold downwardly while engaged with the glass, supplying pressure to the interior of the annular mass of glass formed by the downward movements of the neck mold away from the outlet, controlling the wall thickness of the annular mass of glass being formed by coordination of the pressure supplied to the interior of the annular mass of glass with the rate of movement of the neck mold away from the outlet, and severing a desired portion of the annular mass of glass thus formed from the parent body in such manner as to seal the upper end of the portion of glass thus severed to form a hollow body of glass.

14. The method of making hollow blown glassware which comprises causing molten glass to issue downwardly from a discharge outlet in an annular mass, receiving the lower end of the annular mass thus discharged in a neck mold spaced below the outlet and about an upwardly disposed neck pin in the neck mold, applying suction to the glass within the neck mold to aid in forming the neck portion of an article of hollow glassware, moving the neck mold downwardly with respect to the outlet while engaged with the glass and at a speed sufficiently slow to prevent undue attenuation of the annular mass of glass between the neck mold and the outlet, severing a desired portion of the annular mass of glass thus formed from the parent body of glass in such manner as to seal the upper end of the portion of glass thus severed to form a hollow body of glass connected with the neck mold, withdrawing the neck pin from contact with the glass by movement with respect to the neck mold, and expanding the hollow body of glass thus formed in a body mold associated with the neck mold by pressure supplied through the neck mold between it and the neck pin.

15. The method of making hollow blown glassware, which comprises causing molten glass to issue downwardly from a discharge outlet in an annular mass, receiving the open lower end of the annular mass of glass thus discharged in a neck mold spaced below the outlet and about an upwardly disposed neck pin in said neck mold, applying suction to the glass within the neck mold to aid in the formation of the neck portion of an article of hollow glassware, moving the neck mold downwardly while engaged with the glass therein at a speed sufficiently slow to prevent undue attenuation of the annular mass of glass intermediate the neck mold and the outlet and thereby forming a tubular body of glass, surrounding the tubular body of glass thus formed by a body mold in cooperative relation with the neck mold, severing the tubular body of glass at a level above the upper end of the body mold in such manner as to seal both ends of the glass substantially at the plane of severance, expanding the body of glass thus severed into conformity with the internal configuration of the body mold and thus completing the formation of a hollow article, and piercing the lower sealed end of the stub of glass depending from the outlet to provide an open lower end thereof preparatory to the formation of the next succeeding article as aforesaid.

16. The method of making blown glassware, which comprises causing molten glass to issue downwardly from an annular discharge outlet in an annular mass, receiving the lower end of the mass upon a downwardly and inwardly beveled receiving member in cooperation with a neck mold and a neck pin, drawing the glass into the neck mold and around the neck pin by suction supplied through the neck mold and thereby forming a neck or finish portion on the lower end of the glass, retracting the neck mold downwardly from the outlet at a selected speed coordinated with the rate of flow of glass downwardly through the outlet to form a tube-like body portion connecting the neck or finish of glass in the neck mold with the parent body of glass, surrounding the tube-like body portion by a final blow body mold having an internal configuration to form the body of the article to be made, shearing the tube-like body of glass at a level spaced a short distance above the upper end of the body mold to seal both ends of the glass substantially at the plane of severance, completing the formation of the desired article from the severed body of glass by supplying pressure through the neck mold to expand the glass into conformity with the internal shape of the body mold, and forming an aperture centrally through the stub of glass depending from the outlet to prepare this stub for the formation of the next succeeding article as aforesaid.

17. Apparatus for forming hollow glass articles, comprising a container for a supply of molten glass having a downwardly opening orifice in the bottom thereof, means associated therewith to cause glass to flow from said orifice in an annular stream, a neck mold and an associated neck pin located beneath said orifice and constructed and arranged to receive the lower end of the annular stream of glass depending from the orifice for forming a neck finish portion on such lower end, and means spaced below said orifice for severing a portion of glass attached to said neck mold by the formed finish thereon from the parent body of glass.

18. In the manufacture of articles of hollow glassware from an annular mass of glass depending from an outlet in which the severing of successive charges serves to seal the end of the stub of glass depending from the outlet subsequent to the severance, that method of providing an aperture in the depending stub for the production of the next succeeding article, which comprises directing a gaseous fluid axially upward against the sealed stub of glass to pierce an opening therethrough, and supplying heat from opposite the direction of application of the gaseous fluid through the glass annulus thus formed to remelt and homogenize the glass bordering the aperture thus formed.

19. In the manufacture of articles of hollow glassware from an annular mass of glass depending from an outlet in which the severing of successive charges serves to seal the end of the stub of glass depending from the outlet subsequent to the severance, that method of providing an aperture in the depending stub for the production of the next succeeding article, which comprises directing an intense flame upwardly centrally of the sealed stub against the sealing portion to pierce an aperture therethrough and remelt and homogenize the glass bordering the aperture thus formed to prepare the stub for the production of the next succeeding article.

20. In the manufacture of articles of hollow glassware from an annular mass of glass depending from an outlet in which the severing of successive charges serves to seal the end of the stub of glass depending from the outlet subsequent to the severance, that method of providing an aperture in the depending stub for the production of the next succeeding article, which comprises directing a flame upwardly against the sealing portion of the depending stub of glass centrally thereof to pierce an aperture through such sealing portion, and remelting and homogenizing the glass bordering the aperture thus formed by the combined action of the heat of the piercing flame and heat supplied independently from a separate source from above and interiorly of the annular mass of glass.

21. Apparatus for forming hollow glass articles comprising a container for a supply body of molten glass having a downwardly opening discharge orifice, means associated therewith to cause glass to flow through said orifice in an annular stream, a neck mold and an associated neck pin positioned beneath said orifice and constructed and arranged to receive the lower end of the annular stream of glass depending therefrom and to form a neck portion on the lower end thereof, said neck mold being movable at a controlled speed away from the orifice for forming a tubular portion of glass connecting the neck or finish portion within the neck mold with the glass of the supply body in said container, and severing means spaced below the orifice constructed and arranged to sever the tubular body of glass connecting the neck or finish portion held in the neck mold from the parent body and thereby to seal the upper end of the severed glass for the formation of a glass article therefrom.

22. Apparatus for forming hollow glass articles, comprising a container for a supply body of molten glass having a downwardly opening orifice therein, means associated therewith to cause glass to flow through said orifice in an annular stream to form a tubular body of glass, a neck mold located beneath the orifice to receive the lower end of the annular stream of glass depending therefrom and to form such lower end into the neck or finish portion of an article of glass, a body mold arranged to cooperate with the neck mold and to surround the tubular body of glass formed as aforesaid between the neck mold and the orifice, a burner arranged to supply products of combustion to the space within the tubular body of glass formed as aforesaid during the formation thereof, a flue outlet for the products of combustion of said burner means including a damper associated with said flue outlet for controlling the pressure within the tubular body of glass during the formation thereof and thereby assisting in controlling the wall thickness of the tubular body of glass, and severing means arranged to sever the tubular body of glass at a level spaced below said orifice and above the top of said body mold and serving to seal the upper end of the severed glass within said body mold.

23. Apparatus for forming hollow glass articles, comprising a container for a supply body of molten glass having a downwardly opening orifice at the bottom thereof, means associated therewith to cause the glass to flow through said orifice in an annular stream, a downwardly and inwardly beveled glass receiving member and a neck mold associated therewith for receiving the lower end of the annular stream of glass while it remains integral with the glass of said supply body, a neck pin associated with said neck mold, means associated with said neck mold and neck pin for applying suction to draw the lower end of the depending annular stream of glass into said neck mold and around said neck pin to form the neck finish portion of the desired article and thereafter to supply pressure to expand the article, a burner for supplying flame toward the interior of said annular stream of glass from above during and after the formation of a neck finish portion on the lower end thereof, a damper controlled outlet for the products of combustion from said burner for assisting in the control of the wall thickness of the article by the control of the pressure within a tubular body formed from the annular stream of glass during its formation, a body mold adapted to be associated with said neck mold subsequent to the removal of said beveled glass receiving member for surrounding the tubular body of glass while it is still integral with the glass of said supply body, shearing means for severing the tubular body of glass at a plane spaced above the upper end of the body mold and below said orifice and arranged to seal both ends of the tubular body of glass substantially at the plane of severance, and a bottom plate subsequently cooperable with said body mold to define the bottom of a cavity into conformity with which the severed glass is blown to form the desired article.

24. Apparatus for forming hollow glass articles, comprising a container for a supply body of molten glass having a downwardly opening discharge orifice in its bottom, means forming a hollow chamber within said container having an internal orifice forming member arranged to cooperate with the walls of the orifice in said container to provide an annular glass passage for the formation of an annular depending stream of glass, means for severing successive annular charges of glass from the annular depending stream in such manner as to seal the lower end of the stub depending from the orifice, and means operative subsequent to the severance and sealing as aforesaid for supplying gaseous fluid upwardly and substantially axially of said orifice to pierce an aperture through the seal formed by the severance to prepare the depending stub of glass for the formation of the next succeeding article.

25. Apparatus for forming hollow glass articles, comprising a container for a supply body of molten glass having a downwardly opening discharge orifice in its bottom, means forming a chamber at least partially within said container and having an orifice forming portion at its lower end arranged to cooperate with the walls of the first named orifice to define an annular glass passage for the supplying or an annular mass of glass downwardly from said orifice, severing means arranged to operate in a plane spaced below said orifice for severing successive annular charges of glass from the annular mass of glass depending from said orifice and simultaneously operating to seal the lower end of the stub of glass remaining after the severance, means for directing a gaseous fluid substantially axially upward against the sealing portion of the stub of glass for piercing an aperture therethrough, preparatory to the formation of the next succeeding article from an annular mass of glass having an open lower end, and means for supplying heat to the interior of said chamber for remelting and homogenizing the glass bordering the aperture thus formed.

26. Apparatus for forming hollow glass articles, comprising a container for a supply body of molten glass having a downwardly opening orifice in its bottom, means forming a chamber at least partially within said container and having an internal orifice forming member arranged to be located centrally of said orifice to define an annular glass passage for the downward discharge of an annular mass of molten glass from said supply body, means operating periodically to sever annular charges of glass from the depending annular mass of glass for the formation of individual articles therefrom and simultaneously operating to seal the lower end of the stub depending from said orifice, a burner nozzle arranged to direct a piercing flame centrally upwardly against the sealing portion of the stub of glass depending from the orifice and movable vertically upwardly so as to pierce an aperture therethrough by the joint piercing action of the flame and the mechanical action of the upward movement of the burner nozzle on the glass, a second burner adapted to direct a flame into the interior of said chamber and operating conjointly with the piercing burner to melt and homogenize the glass bordering the aperture made as aforesaid in the stub of molten glass preparatory to the formation of the next succeeding article from an annular mass of glass having an open lower end.

GEORGE E. HOWARD.